United States Patent [19]

Harry

[11] Patent Number: 4,932,766
[45] Date of Patent: Jun. 12, 1990

[54] EXTERIOR MIRROR FOR MOTOR VEHICLE

[75] Inventor: Jean-Michel Harry, Avon, France

[73] Assignee: Britax (Geco) S.A., France

[21] Appl. No.: 344,769

[22] Filed: Apr. 28, 1989

[30] Foreign Application Priority Data

Apr. 29, 1988 [GB] United Kingdom ............... 8810219

[51] Int. Cl.⁵ .............................................. B60R 1/06
[52] U.S. Cl. ................................. 350/604; 350/632; 248/479; 248/549; 248/900
[58] Field of Search ............... 350/604, 632, 635, 636; 248/479, 480, 549, 900

[56] References Cited

U.S. PATENT DOCUMENTS

| 4,592,529 | 6/1986 | Suzuki | 350/604 |
|---|---|---|---|
| 4,740,066 | 4/1988 | Whitehead | 248/486 |
| 4,755,033 | 7/1988 | Whitehead et al. | 248/549 |

FOREIGN PATENT DOCUMENTS

| 0290232 | 11/1988 | European Pat. Off. | 350/635 |
|---|---|---|---|
| 3032392 | 3/1982 | Fed. Rep. of Germany | 350/604 |
| 0214431 | 12/1983 | Japan | 350/604 |

Primary Examiner—Bruce Y. Arnold
Assistant Examiner—R. D. Shafer
Attorney, Agent, or Firm—Davis, Bujold & Streck

[57] ABSTRACT

An exterior mirror for a motor vehicle has a base member adapted to be mounted on a vehicle body, a housing containing a reflective member and having an end face to confront the base member with a peripheral edge serving as an abutment edge which engages the base member for relative pivotal movement. A link is pivotally connected at one end to the base member and a tension spring is connected between the link and an attachment point in the interior of the housing to urge the abutment edge on the housing into abutment with the base member. The end of the link opposite to the end connected to the base member is pivotally connected to the housing and the spring is connected to an intermediate point on the link. The base member and housing are shaped to conceal the abutment edge of the housing when said peripheral edge is in engagement with the base member around its entire periphery. The base member has a cam surface shaped to engage the abutment edge on one side of the housing, thereby to displace the housing away from the base member as soon as pivotal movement commences in a predetermined direction.

8 Claims, 4 Drawing Sheets

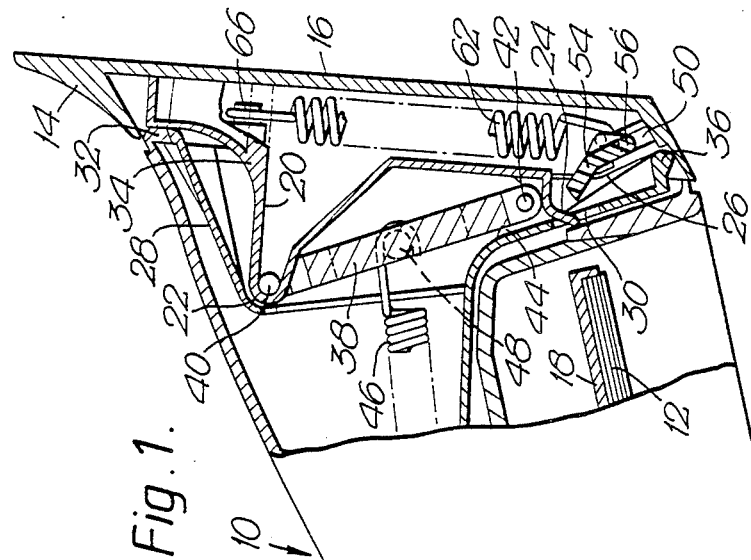
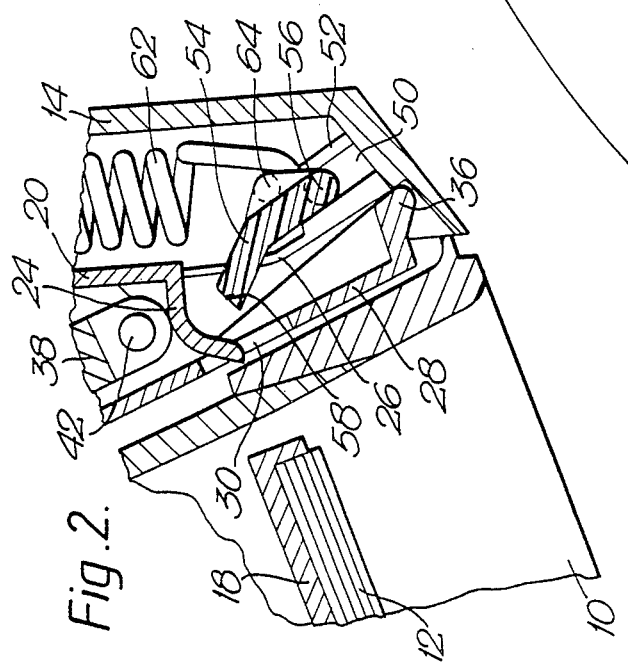

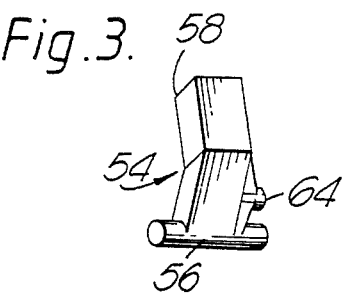
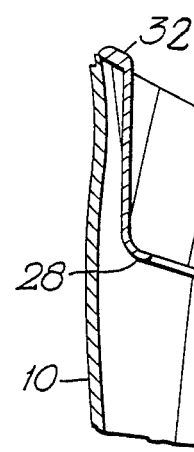
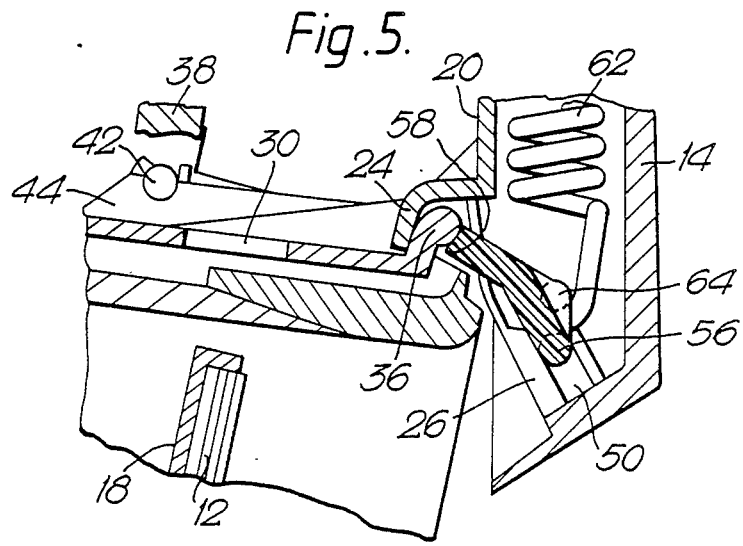

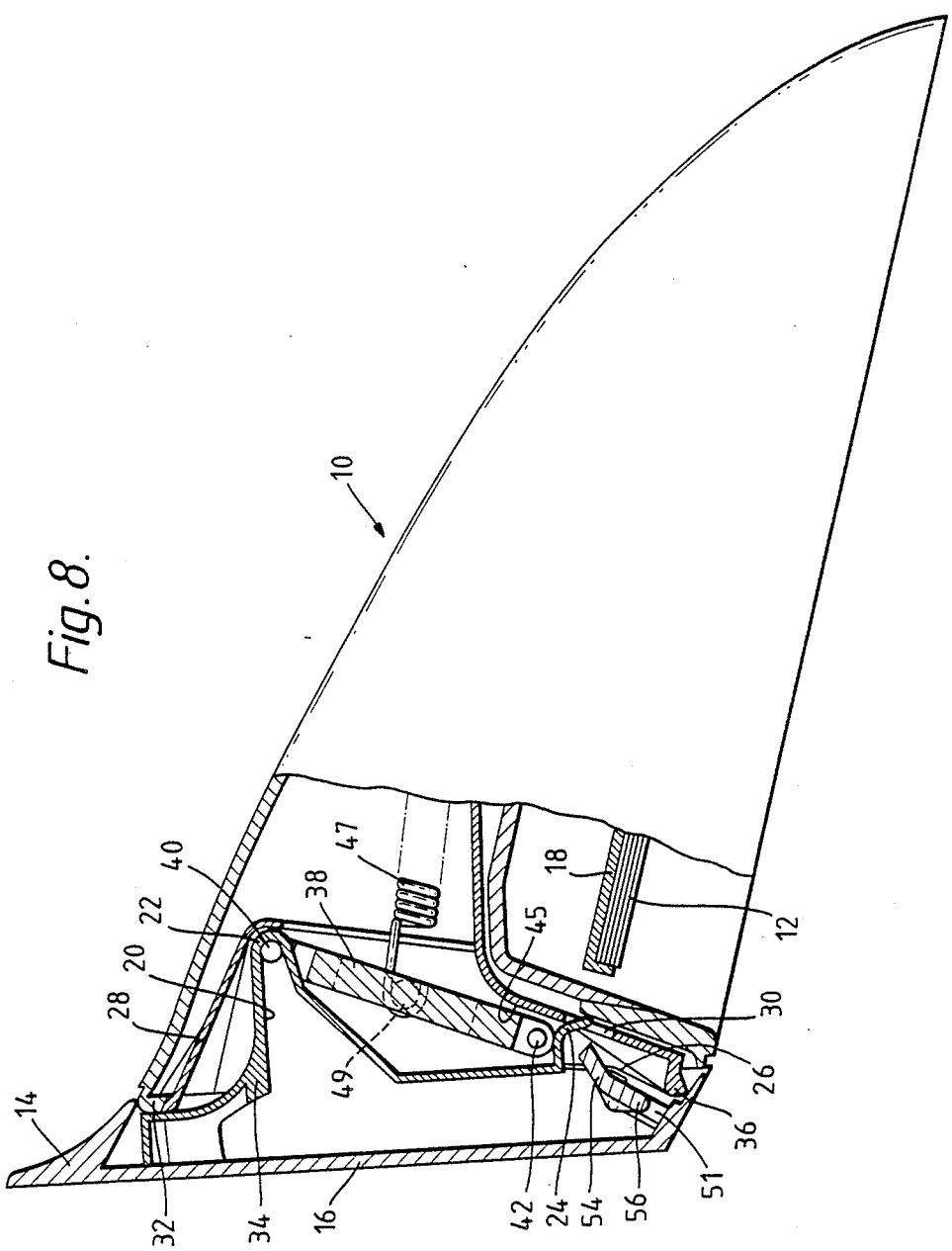

EXTERIOR MIRROR FOR MOTOR VEHICLE

This invention relates to an exterior mirror for a motor vehicle having a base member adapted to be mounted on a vehicle body, a housing containing a reflective member and having an end face adapted to confront the base member with a peripheral edge round said end face serving as an abutment edge engaging with the base member for relative pivotal movement, a link pivotally connected at one end to the base member and a tension spring connected between the link and an attachment point in the interior of the housing and adapted to urge the abutment edge on the housing into abutment with the base member. A mirror of this type is disclosed in DE-A-No. 2838465.

Mirrors of the foregoing type are subject to the disadvantage that any exterior surface finish is liable to damage in the vicinity of the above-mentioned perepheral edge during pivotal movement of the housing relative to the base member. Such damage is particularly unsightly when the housing and/or base member is exposed because the underlying material revealed when the paint is damaged is usually black plastics. The present invention aims to provide an exterior mirror which is not subject to this disadvantage.

According to the invention, in an exterior mirror of the foregoing type, the end of the link opposite to the end connected to the base member is pivotally connected to the housing and the spring is connected to an intermediate point on the link, the base member and housing are shaped to conceal the abutment edge of the housing when said edge is in engagement with the base member around its entire periphery and the base member has a cam surface shaped to engage with the abutment edge on one side of the housing, thereby to displace the housing away from the base member as soon as pivotal movement commences in a predetermined direction.

An embodiment of the invention will now be described, by way of example, with reference to the accompanying drawings in which:

FIG. 1 is a partially broken away plan, from above, view of a rear view mirror in accordance with the invention, in its position of normal use;

FIG. 2 is a fragmentary view, on an enlarged scale, of part of the mechanism shown in FIG. 1;

FIG. 3 is a perspective view of the pawl of the mirror shown in FIGS. 1 and 2;

FIG. 4 is a sectional view, corresponding to the broken away part of the plan view of FIG. 1, but showing the mirror housing displaced rearwardly from its position of normal use;

FIG. 5 is a fragmentary view, similar to FIG. 2 but showing the mechanism in the position illustrated in FIG. 4;

FIG. 8 is a fragmentary plan view, from below, of the mirror shown in FIG. 1, partially broken away on the same plane.

Figure 6:
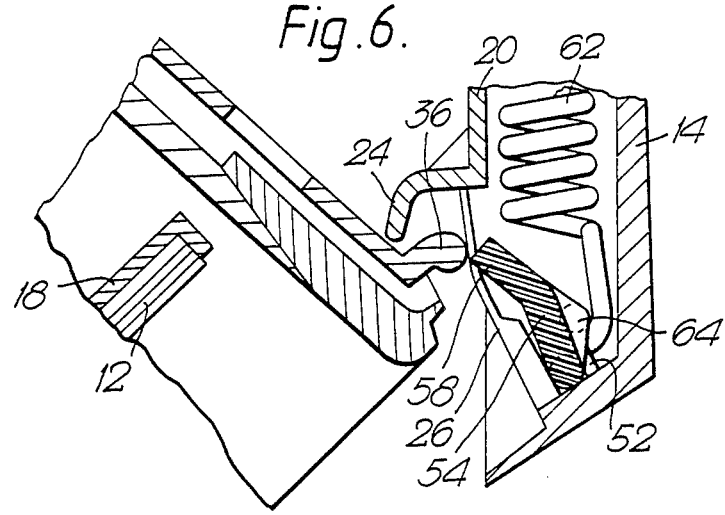
FIG. 6 is a fragmentary sectional view, similar to FIG. 5 but showing the mechanism in the position just after commencement of the movement returning the housing to its position of normal use.

Referring first to FIG. 1 and 8 a vehicle rear view mirror consists of a housing 10 in which is mounted a reflection member 12 and which is itself mounted on a base member 14 having a surface 16 adapted to abut against the door (not shown) of a motor car. The reflective member 12 is mounted on a mirror carrier 18 which is secured to a mechanism (not shown) which permits adjustment of its orientation relative to the housing 10. This mechanism forms no part of the invention and will not be described in detail.

On the opposite side from the surface 16, the base member 14 carries a support member 20 which includes a U-shaped formation arranged to form a pivot socket 22 adjacent to its front end (in the direction of vehicle travel) and a hook-like stop formation 24 at its rear end. A first cam surface 26 extends from the rear end of the base member 14 to the stop formation 24 but is located below the plane on which the sectional view in the drawings are taken. A similar flange (not shown) is located above such plane in a symmetrical location relative to the centre line of the support member 20.

At its inner end, the mirror housing 10 is secured fast with a coupling member 28 which has an opening 30 to accommodate the end of the stop formation 24. The coupling member 28 has a front abutment edge 32 adapted to engage with a second cam surface 34 formed on the support member 20 between its front end and the pivot socket 22. At its rear end, the coupling member 28 has a rear abutment edge 36 adapted to engage with the first cam surface 26 on the base member 14. A link 38 carries a pivot pin 40 at one end which engages in the pivot socket 22 on the support member 20. A second pivot pin 42 at the other end of the link 38 is secured to a brackets 44 and 45 which projects from the coupling member 28. Main tension springs 46 and 47 extend from respective attachment points 48 and 49 located at an intermediate point between the ends of the link 38, and a second attachment point (not shown) within the interior of the housing. The pivot socket 22 on the support member 20 secured to the base member 14 and the brackets 44 and 45 on the coupling member 28 secured to the housing 10 are so positioned that the springs 46 and 47 have has the effect of pulling the abutment edges 36 and 32 into engagement with the first cam surface 26 and the second cam surface 34 respectively, thus holding the housing in the position shown in FIG. 1.

As can be seen from FIG. 2, the rearward end of the face of the first cam surface 26 nearer to the car bounds one side of an open-ended slot 50, the other side of which is bounded by a wall formation 52 extending from the base member 14. Referring also to FIG. 3, a pawl 54 is formed from plastics material and has an integrally moulded pivot pin 56 at one end. One end of the pivot pin 56 engages in the slot 50 and the other and engages in a corresponding slot 51 (FIG. 8) above the level of the support member 20.

The pawl 54 has a main pawl tip 58 which is shaped so as to project outwardly of the first cam surface 26. The end of the wall formation nearer to the pawl tip 58 curves through a right angle so as to join with the first cam surface 26. A third tension spring 62 extends between a lateral projection 64 on the pawl 54 and an attachment point 66 on the support member 20 and biases the pivot pin 56 into engagement with this curved formation.

In use, if the housing 10 is displaced rearwardly, it initially pivots about the pivot pin 42 against the action of the main tension springs 46 and 47. The rear abutment edge 36 moves along the first cam surface 26, causing immediate separation of the visible edges where the housing abuts against the base member 14. When the rear abutment edge 36 reaches the pawl tip 58, it causes the pawl 54 to pivot about its pin 56 in the clockwise direction, as viewed in FIG. 1. The rear abutment edge 36 then moves past the pawl tip 58 into the position illustrated in FIGS. 4 and 5. Although main tension springs 46 and 47 tend to bias the housing 10 back towards the position illustrated in FIG. 1, it is in fact retained in the position illustrated in FIGS. 4 and 5 by the pawl 54, because the force exerted on the pawl 54 directly by the spring 62 is greater than the force exerted on the pawl 54 indirectly by the springs 46 and 47.

If a sufficient force is applied to the housing 10 in a direction to restore it to its normal position shown in FIG. 1, the rear abutment edge 36 slides along the stop formation 24, displacing the pawl 58 along the slot 50 against the action of the spring 62 to the position shown in FIG. 6 in which the pawl tip 58 is level with the surface of the first surface cam 26. The pawl 54 is then no longer in engagement with the rear abutment edge 36 and is pulled back to its original position (shown in FIGS. 1 and 2) by the third tension spring 62. There is now nothing to obstruct the action of the main tension springs 46 and 47 which pulls the housing 10 back to the position shown in FIG. 1.

Figure 7:
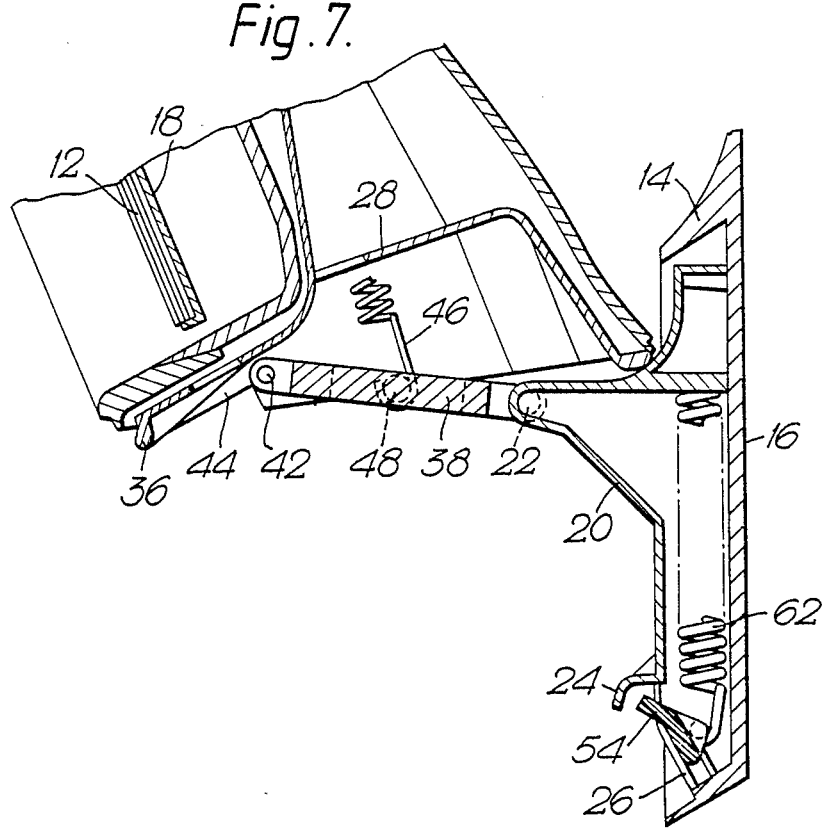
FIG. 7 is a sectional view, similar to FIG. 4, but showing the housing in its fully forwardly displaced position.

Should the housing 10 be displaced forwardly from its position shown in FIGS. 1 and 2, the front abutment edge 32 initially moves along the second cam surface 34, causing immediate separation of the visible edges where the housing 10 abuts against the base member 14. The link 38 pivots forwardly about pivot pin 40 and the housing 10 moves to the position shown in FIG. 7. There is no mechanism for retaining the housing in this position and consequently it is pulled back to its original position (shown in FIGS. 1 and 2) by the springs 46 and 47 as soon as the displacing force is removed.

I claim:

1. An exterior mirror for a motor vehicle, having a base member adapted to be mounted on a vehicle body, a housing containing a reflective member and having an end face to confront the base member with a peripheral edge serving as a rear abutment edge which engages the base member for relative pivotal movement, a link pivotally connected at one end to the base member and pivotally connected at its other end to the housing, and a tension spring connected between a point on the link between its ends and an attachment point in the interior of the housing to urge the rear abutment edge on the housing into abutment with the base member, the base member and housing being shaped to conceal the rear abutment edge of the housing when said peripheral edge is in engagement with the base member around its entire periphery and the base member having a first cam surface to engage the rear abutment edge of said housing to displace the housing away from the base member as soon as pivotal movement commences in a predetermined direction.

2. An exterior mirror according to claim1, wherein the first cam surface has a stop formation position to limit travel of the rear abutment edge therealong.

3. An exterior mirror according to claim 2, wherein the base member has a second cam surface to engage a front abutment edge located on the opposite side of the housing, thereby to displace the housing away from the base member as soon as pivotal movement commences in a direction opposite to said predetermined direction.

4. An exterior mirror according to claim 1, wherein the base member has a second cam surface to engage a front abutment edge located on the opposite side of the housing, thereby to displace the housing away from the base member as soon as pivotal movement commences in a direction opposite to said predetermined direction.

5. An exterior mirror for a motor vehicle, having a base member adapted to be mounted on a vehicle body, a housing containing a reflective member and having an end face to confront the base member with a peripheral edge serving as a rear abutment edge which engages the base member for relative pivotal movement, a link pivotally connected at one end to the base member and pivotally connected at its other end to the housing, and a tension spring connected between a point on the link between its ends and an attachment point in the interior of the housing to urge the rear abutment edge on the housing into abutment with the base member, the base member and housing being shaped to conceal the rear abutment edge of the housing when said peripheral edge is in engagement with the base member around its entire periphery and the base member having a first cam surface to engage the rear abutment edge of said housed to displace the housing away from the base member as soon as pivotal movement commences in a predetermined direction, a stop formation positioned to limit travel of the rear abutment edge along the first cam surface, and a pawl mounted on a pivot pin which is journaled in a slot in the base member, the pawl being resiliently biased into a position in which it projects past the first cam surface so that the pawl engages the rear abutment edge to retain the mirror in its fully displaced position.

6. An exterior mirror according to claim 5, wherein the stop formation is so shaped that a force applied to the mirror housing in a direction to displace its back towards its normal position causes the rear abutment edge to slide along the stop formation, displacing the pawl to allow disengagement thereof from the rear abutment edge.

7. An exterior mirror according to claim 6, wherein the base member has a second cam surface to engage a front abutment edge located on the opposite side of the housing. Thereby to displace the housing away from the base member as soon as pivotal movement commences in a direction opposite to said predetermined direction.

8. An exterior mirror according to claim 5, wherein the base member has a second cam surface to engage a front abutment edge located on the opposite side of the housing, thereby to displace the housing away from the base member as soon as pivotal movement commences in a direction opposite to said predetermined direction.

* * * * *

UNITED STATES PATENT AND TRADEMARK OFFICE
CERTIFICATE OF CORRECTION

PATENT NO. : 4,932,766

DATED : June 12, 1990

INVENTOR(S) : Jean-Michael HARRY

It is certified that error appears in the above-identified patent and that said Letters Patent is hereby corrected as shown below:

Column 4, line 29 - delete "housed" insert --housing--.

Signed and Sealed this

Twenty-sixth Day of November, 1991

Attest:

HARRY F. MANBECK, JR.

*Attesting Officer*  *Commissioner of Patents and Trademarks*